(12) United States Patent  
Gonciulea et al.

(10) Patent No.: US 12,530,607 B1
(45) Date of Patent: Jan. 20, 2026

(54) SYSTEMS AND METHODS FOR SELECTING A QUANTUM CIRCUIT

(71) Applicant: Wells Fargo Bank, N.A., San Francisco, CA (US)

(72) Inventors: Constantin Gonciulea, Summit, NJ (US); Vanio Markov, New York, NY (US); Charlee Alexandra Stefanski, New York, NY (US); Abhijit Bhima Rao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 675 days.

(21) Appl. No.: 17/934,086

(22) Filed: Sep. 21, 2022

(51) Int. Cl.
*G06N 10/20* (2022.01)

(52) U.S. Cl.
CPC .................................. *G06N 10/20* (2022.01)

(58) Field of Classification Search
CPC .............................. G06N 10/20; G06N 10/40
See application file for complete search history.

(56) References Cited

U.S. PATENT DOCUMENTS

| | | | |
|---|---|---|---|
| 11,694,107 B1 | 7/2023 | Budinski | |
| 2003/0005010 A1 | 1/2003 | Cleve | |
| 2018/0096258 A1 | 4/2018 | Burchard | |
| 2020/0089832 A1* | 3/2020 | Shao | G06N 10/20 |
| 2020/0334563 A1 | 10/2020 | Gambetta | |
| 2020/0342344 A1* | 10/2020 | Gambetta | G06N 20/00 |
| 2021/0271477 A1 | 9/2021 | Jiang | |
| 2021/0357229 A1* | 11/2021 | Gonciulea | G06N 10/60 |
| 2023/0030423 A1 | 2/2023 | Rubin | |
| 2023/0036827 A1* | 2/2023 | Herbert | G06N 10/60 |
| 2024/0183670 A1 | 6/2024 | Ushijima-Mwesigwa | |

OTHER PUBLICATIONS

Vanio Markov, Charlee Stefanski, Abhijit Rao, and Constantin Gonciulea. "A Generalized Quantum Inner Product and Applications to Financial Engineering". 2022.

Lov K Grover. "A fast quantum mechanical algorithm for database search. In Proceedings of the twenty-eighth annual ACM symposium on Theory of computing", pp. 212-219, 1996.

(Continued)

*Primary Examiner* — Nghia M Doan
(74) *Attorney, Agent, or Firm* — K&L Gates LLP (57) ABSTRACT

Systems, apparatuses, methods, and computer program products are disclosed for selecting a quantum circuit. An example method includes identifying, by communications hardware, a set of input attributes. The example method also includes determining, by quantum circuit selection circuitry, a set of quantum circuit selection criteria based on the set of input attributes. The example method also includes choosing, by the quantum circuit selection circuitry, a quantum circuit design from a collection of pre-determined quantum circuit designs and based on the set of quantum circuit selection criteria. The example method also includes generating, by quantum circuit generation circuitry, a quantum circuit for the chosen quantum circuit design. The example method also includes outputting, by the communications hardware, the generated quantum circuit.

20 Claims, 6 Drawing Sheets

(56) References Cited

OTHER PUBLICATIONS

Don Coppersmith. "An approximate fourier transform useful in quantum factoring. Technical Report IBM Research Report RC19642", IBM, 1994.

Austin Gilliam, Charlene Venci, Sreraman Muralidharan, Vitaliy Dorum, Eric May, Rajesh Narasimhan, and Constantin Gonciulea. "Foundational patterns for efficient quantum computing", 2021. URL: https://arxiv.org/abs/1907.11513.

Austin Gilliam, Stefan Woerner, and Constantin Gonciulea. "Grover adaptive search for constrained polynomial binary optimization". Quantum, 5:428, Apr. 2021. ISSN 2521-327X. DOI: 10.22331/q-2021-04-08-428.

Maria Schuld and Nathan Killoran. "Quantum machine learning in feature hilbert spaces". Physical Review Letters, 122(4), Feb. 2019. ISSN 1079-7114. DOI: 10.1103/physrevlett.122.040504.

Ryan O'Donnell. "Analysis of boolean functions". CoRR, abs/2105.10386, 2021. URL: https://arxiv.org/abs/2105.10386.

Steven Herbert. "No quantum speedup with grover-rudolph state preparation for quantum monte carlo integration". Physical Review E, 103(6), Jun. 2021. ISSN 2470-0053. DOI: 10.1103/physreve.103.063302.

Stefan Woerner and Daniel J. Egger. "Quantum risk analysis". npj Quantum Information, 5 (1), Feb. 2019. ISSN 2056-6387. DOI: 10.1038/s41534-019-0130-6.

David H Raab and Edward H Green. "A cosine approximation to the normal distribution". Psychometrika, 26(4):447-450, 1961. ISSN 0033-3123.

Nikitas Stamatopoulos, Daniel J. Egger, Yue Sun, Christa Zoufal, Raban Iten, Ning Shen, and Stefan Woerner. "Option pricing using quantum computers". Quantum, 4:291, Jul. 2020. ISSN 2521-327X. DOI: 10.22331/q-2020-07-06-291.

Harry Buhrman, Richard Cleve, John Watrous, and Ronald de Wolf. "Quantum fingerprinting". Physical Review Letters, 87 (16), Sep. 2001. ISSN 1079-7114. DOI: 10.1103/physrevlett.87.167902.

Seth Lloyd, Masoud Mohseni, and Patrick Rebentrost. "Quantum algorithms for supervised and unsupervised machine learning", 2013.

Francesco Tacchino, Chiara Macchiavello, Dario Gerace, and Daniele Bajoni. "An artificial neuron implemented on an actual quantum processor". npj Quantum Information, 5(1), Mar. 2019. ISSN 2056-6387. DOI: 10.1038/s41534-019-0140-4.

Yunchao Liu, Srinivasan Arunachalam, and Kristan Temme. "A rigorous and robust quantum speed-up in supervised machine learning". CoRR, abs/2010.02174, 2020. URL: http://dblp.uni-trier.de/db/journals/corr/corr2010.html#abs-2010-02174.

Botsinis et al., "Quantum Search Algorithms for Wireless Communications", in IEEE Communications Surveys & Tutorials, vol. 21, No. 2, Second Quarter 2019, pp. 1209-1242.

Schuld et al., "The effect of data encoding on the expressive power of variational quantum machine learning models", arXiv preprint arXiv:2008.08605vs, Oct. 9, 2021 (16 pages).

* cited by examiner

SYSTEMS AND METHODS FOR SELECTING A QUANTUM CIRCUIT

BACKGROUND

Quantum computers have been shown to provide significant advantages for solving particular problems that are difficult or costly for classical computers to solve. However, expert knowledge of the particular algorithms best suited to each of these problems is relatively rare, presenting a barrier hindering the widespread use of quantum computers to solve practical problems.

BRIEF SUMMARY

Although still in its infancy, quantum computing and its potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. These features allow quantum computers to perform incredibly complex calculations at speeds not realizable today and solve certain classes of problems that are beyond the capability of existing classical computers.

Quantum computing is one of an array of emerging quantum technologies that present a wide field of potential applications. Quantum sensing and quantum communications are expected to have wide-ranging technological impact, and advances in the field of quantum computing may enable or find further applications in these fields.

While future quantum computers promise to outperform classical computers on a number of computationally intensive tasks, several hurdles today prevent their widespread use. One such hurdle is the technical expertise needed to select a particular quantum circuit for solving a problem. Such technical expertise is relatively rare, so there is a need to create systems and methods that automate the process of selecting a quantum circuit for a particular application.

Systems, apparatuses, methods, and computer program products are disclosed herein for selecting a quantum circuit.

In one example embodiment, a method is provided for selecting a quantum circuit. The method includes identifying, by communications hardware, a set of input attributes. The method also includes determining, by quantum circuit selection circuitry, a set of quantum circuit selection criteria based on the set of input attributes. The method also includes choosing, by the quantum circuit selection circuitry, a quantum circuit design from a collection of pre-determined quantum circuit designs and based on the set of quantum circuit selection criteria. The method also includes generating, by quantum circuit generation circuitry, a quantum circuit for the chosen quantum circuit design. The method also includes outputting, by the communications hardware, the generated quantum circuit.

In another example embodiment, an apparatus is provided for selecting a quantum circuit. The apparatus includes communications hardware configured to identify a set of input attributes. The apparatus also includes quantum circuit selection circuitry configured to determine a set of quantum circuit selection criteria based on the set of input attributes and choose a quantum circuit design from a collection of pre-determined quantum circuit designs and based on the set of quantum circuit selection criteria. The apparatus also includes quantum circuit generation circuitry configured to generate a quantum circuit for the chosen quantum circuit design. The communications hardware of the apparatus is further configured to output the generated quantum circuit.

In another example embodiment, a computer program product is provided for selecting a quantum circuit. The computer program product comprises at least one non-transitory computer-readable storage medium storing software instructions that, when executed, cause a device to identify a set of input attributes. The software instructions, when executed, further cause the device to determine a set of quantum circuit selection criteria based on the set of input attributes. The software instructions, when executed, further cause the device to choose a quantum circuit design from a collection of pre-determined quantum circuit designs and based on the set of quantum circuit selection criteria. The software instructions, when executed, further cause the device to generate a quantum circuit for the chosen quantum circuit. The software instructions, when executed, additionally cause the device to output the generated quantum circuit.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "host" is used to refer to any computing device capable of providing information or services via a network connection. A host may also be a server, as defined above, and may be embodied in any of the devices or modules described therein. A host may also be an organization or remote location providing services via a network connection such that the identity of the device or module providing the host services may not be fixed over time. A host may be a quantum computer or other quantum device capable of executing quantum circuits, or a host may be an organization or remote location providing the services of a quantum computer or other quantum device capable of executing quantum circuits. A host may also be a classical computer or other device capable of simulating a quantum computer and thereby executing a quantum circuit.

The term "quantum circuit" refers to a series of instructions that may be given to a quantum computer or simulated quantum computer, the set of possible instructions comprising operations on quantum states (e.g. qubits) such as quantum logic gates, initializations, or measurements. A quantum circuit may specify an exact list of operations on an exact number of qubits, or have a design that is based on one or more parameters, and is generalized for different numbers of qubits. A quantum circuit need not be associated with any physical computing device or hardware, though it may be designed for a particular computing device. A quantum circuit may be represented in graphical, text, or any other form, so long as it can be interpreted to execute a series of operations on a quantum computer or simulated quantum computer.

Overview

Methods, apparatuses, systems, and computer program products are described herein that provide for selecting a quantum circuit. As noted above, it is difficult to select an appropriate quantum circuit to solve a particular problem, and selection typically requires expert-level knowledge of the mathematical background for each quantum circuit being considered. Even users with such an expert-level familiarity of potential quantum circuits will experience difficulty selecting an ideal circuit for each of a large set of problems, or for a rapidly changing input condition.

To enable selection of a quantum circuit, example embodiments described herein automate the circuit selection process, allowing users to leverage powerful quantum computing technology without detailed knowledge of the quantum mechanical calculations used in each circuit. This automation is analogous to users of classical computers today, who can leverage powerful algorithms to perform calculations for applications in finance, engineering, or the like, without a detailed knowledge of the circuitry, mathematics, and electrodynamics that enable classical computers to perform calculations that would not be practical without computer assistance. In various embodiments, users specify a set of input attributes which may not necessarily require detailed knowledge of the operation of a quantum circuit or quantum computer. In various embodiments, these input attributes may be used to determine a set of criteria for the selection of a quantum circuit, thus abstracting the specific details of these criteria from the user. After determining the quantum circuit selection criteria, the system may then apply the criteria to choose a quantum circuit design and generate a quantum circuit that satisfies the input attributes. Finally, the system may output the generated quantum circuit. In various embodiments the generated quantum circuit may immediately and automatically be put to some productive use and executed on a host device.

Accordingly, the present disclosure sets forth systems, methods, and apparatuses that select quantum circuits in an efficient and user-friendly manner. There are many advantages of these and other embodiments described herein. For instance, the quantum circuit selection system may load new, state-of-the-art quantum circuit designs and add them to the pool of potentially selectable quantum circuits. This allows for new innovations in quantum circuits to be quickly exploited for productive purposes. In addition, by abstracting many of the low-level details of quantum circuit designs, the quantum circuit selection system may be used as an educational or training tool, introducing users to the applications of quantum computing devices. Automating the selection of quantum circuits thus expands the pool of potential users for quantum devices, creating a larger community for creation and dissemination of innovations in quantum information technology.

Although a high level explanation of the operations of example embodiments has been provided above, specific details regarding the configuration of such example embodiments are provided below.

System Architecture

Figure 1:
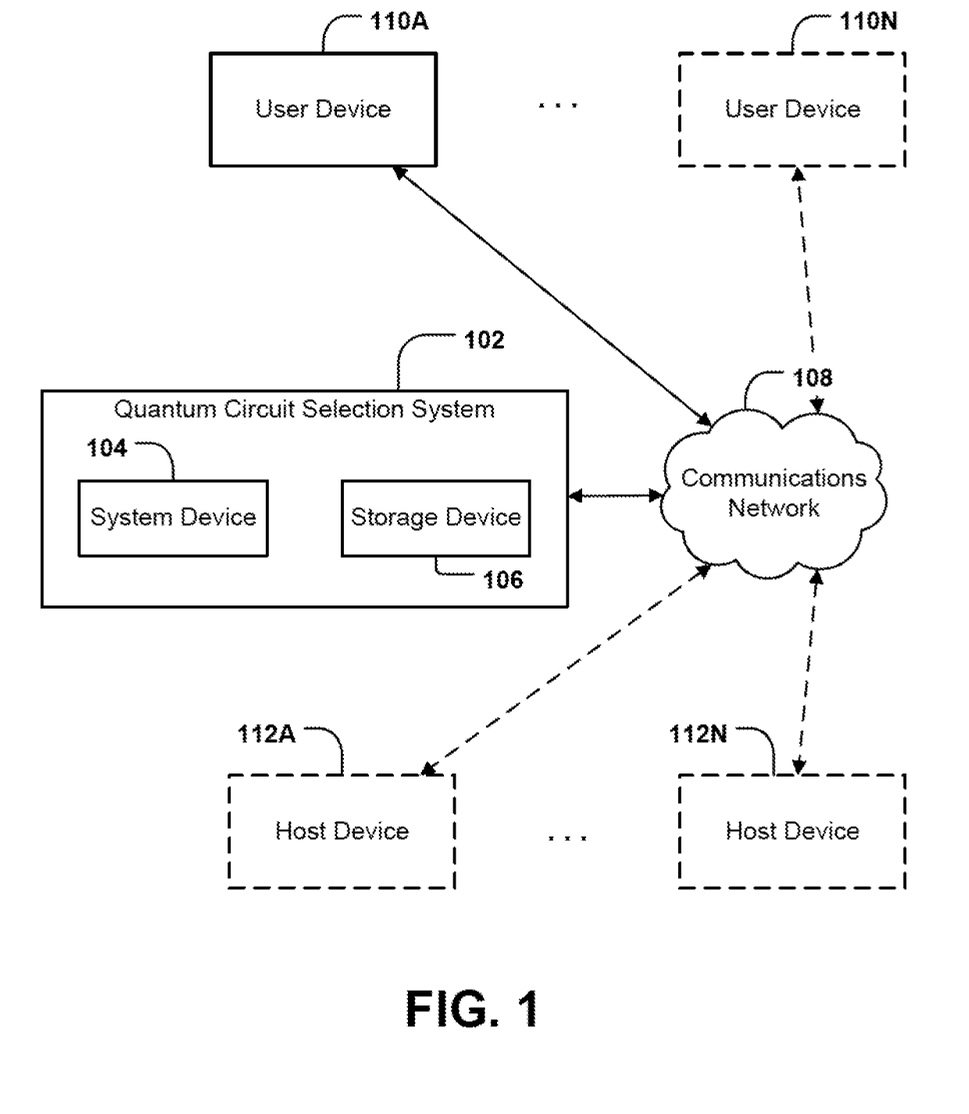
FIG. 1 illustrates a system in which some example embodiments may be used for selecting a quantum circuit, in accordance with some example embodiments described herein.

Example embodiments described herein may be implemented using any of a variety of computing devices or servers. To this end, FIG. 1 illustrates an example environment within which various embodiments may operate. As illustrated, a quantum circuit selection system 102 may include a system device 104 in communication with a storage device 106. Although system device 104 and storage device 106 are described in singular form, some embodiments may utilize more than one system device 104 and/or more than one storage device 106. Additionally, some embodiments of the quantum circuit selection system 102 may not require a storage device 106 at all. Whatever the implementation, the quantum circuit selection system 102, and its constituent system device(s) 104 and/or storage device(s) 106 may receive and/or transmit information via communications network 108 (e.g., the Internet) with any number of other devices, such as one or more of user device 110A through user device 110N and/or host device 112A through host device 112N.

System device 104 may be implemented as one or more servers, which may or may not be physically proximate to other components of quantum circuit selection system 102. Furthermore, some components of system device 104 may be physically proximate to the other components of quantum circuit selection system 102 while other components are not. System device 104 may receive, process, generate, and transmit data, signals, and electronic information to facilitate the operations of the quantum circuit selection system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the quantum circuit selection system 102. Storage device 106 may store information relied upon during operation of the quantum circuit selection system 102, such as various pre-generated quantum circuit designs that may be used by the quantum circuit selection system 102, or the like. In addition, storage device 106 may store control signals, device characteristics, and access credentials enabling interaction between the quantum circuit selection system 102 and one or more of the user device 110A-110N or host device 112A-112N.

The one or more user devices 110A-110N may be embodied by any computing devices known in the art such as desktop or laptop computers, tablet devices, smartphones, or the like. Similarly, the one or more host devices 112A-112N may be embodied by any computing devices known in the art, such as quantum computers, desktop or laptop computers, tablet devices, smartphones, or the like. The one or more user devices 110A-110N and the one or more host devices 112A-112N need not themselves be independent devices, but may be peripheral devices communicatively coupled to other computing devices.

Although FIG. 1 illustrates an environment and implementation in which the quantum circuit selection system 102 interacts with one or more of user device 110A, through user device 110N and/or host device 112A through host device 112N, in some embodiments users may directly interact with the quantum circuit selection system 102 (e.g., via communications hardware 206 of system device 104), in which case a separate user device 110A through 110N may not be utilized. Whether by way of direct interaction or via a separate user device 110A through 110N, a user may communicate with, operate, control, modify, or otherwise interact with the quantum circuit selection system 102 to perform the various functions and achieve the various benefits described herein.

Example Implementing Apparatuses

Figure 2:
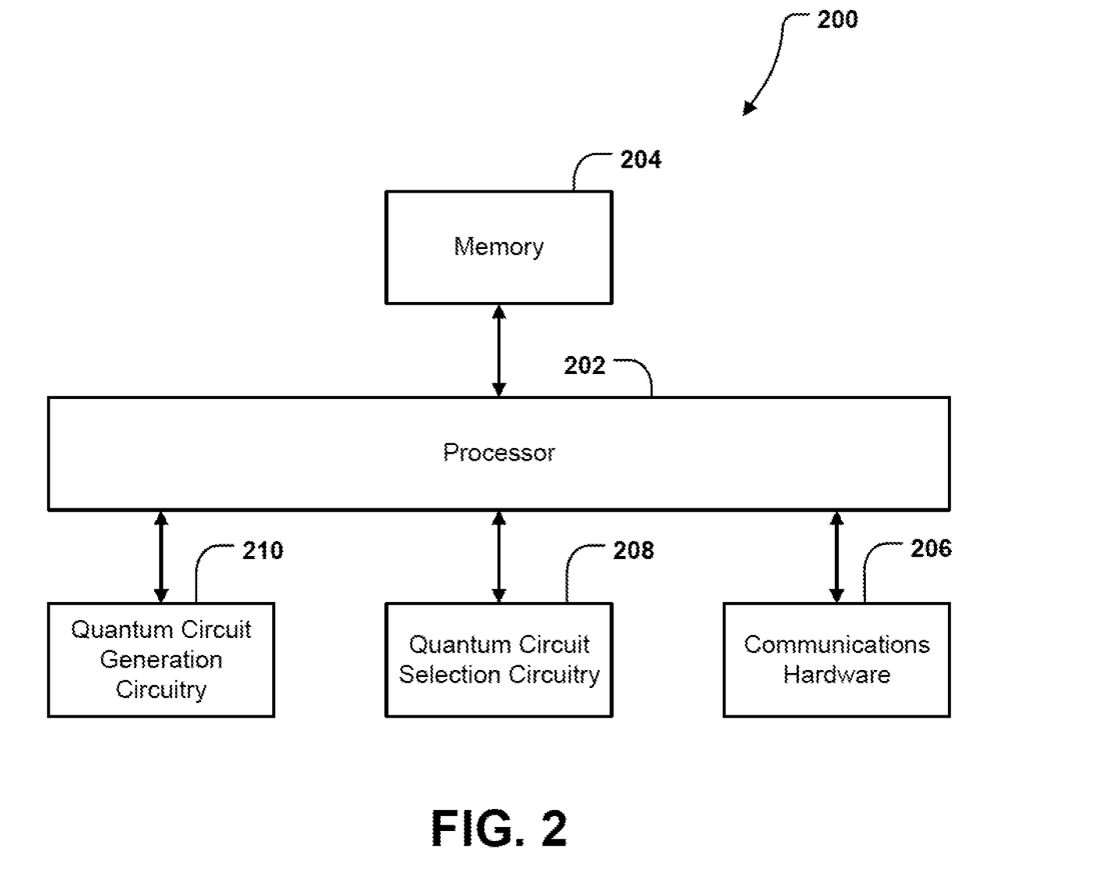
FIG. 2 illustrates a schematic block diagram of example circuitry embodying a device that may perform various operations in accordance with some example embodiments described herein.

System device 104 of the quantum circuit selection system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, quantum circuit selection circuitry 208, and quantum circuit generation circuitry 210, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 3-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be further configured to provide output to a user and, in some embodiments, to receive an indication of user input. The communications hardware 206 may comprise a user interface, such as a display, and may further comprise the components that govern use of a user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises quantum circuit selection circuitry 208 that chooses quantum circuit designs based on selection criteria. The quantum circuit selection circuitry 208 may utilize processor 202, memory 204, or any other hardware component included in the apparatus 200 to perform these operations, as described in connection with FIGS. 3-6 below. The quantum circuit selection circuitry 208 may further utilize communications hardware 206 to gather data from (and/or transmit data to) a variety of sources (e.g., user device 110A through user device 110N or storage device 106, as shown in FIG. 1), and/or to exchange data with a user, and in some embodiments may utilize processor 202 and/or memory 204 to select a quantum circuit design.

In addition, the apparatus 200 further comprises quantum circuit generation circuitry 210 that generates quantum circuits based on quantum circuit designs. The quantum circuit generation circuitry 210 may utilize processor 202, memory 204, or any other hardware component included in the apparatus 200 to perform these operations, as described in connection with FIGS. 3-6 below. The quantum circuit generation circuitry 210 may further utilize communications hardware 206 to gather data from (and/or transmit data to) a variety of sources (e.g., user device 110A through user device 110N or storage device 106, as shown in FIG. 1), and/or to exchange data with a user, and in some embodiments may utilize processor 202 and/or memory 204 to generate quantum circuits.

Although components 202-210 are described in part using functional language, it will be understood that the particular implementations necessarily include the use of particular hardware. It should also be understood that certain of these components 202-210 may include similar or common hardware. For example, the quantum circuit selection circuitry 208 and quantum circuit generation circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the quantum circuit selection circuitry 208 and quantum circuit generation circuitry 210 may leverage processor 202, memory 204, or communications hardware 206 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the quantum circuit selection circuitry 208 and quantum circuit generation circuitry 210 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components described above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-6, example flowcharts are illustrated that contain example operations implemented by example embodiments described herein. The operations illustrated in FIGS. 3-6 may, for example, be performed by system device 104 of the quantum circuit selection system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, quantum circuit selection circuitry 208, quantum circuit generation circuitry 210, and/or any combination thereof. It will be understood that user interaction with the quantum circuit selection system 102 may occur directly via communications hardware 206, or may instead be facilitated by a separate user device 110A through 110N, as shown in FIG. 1, and which may have similar or equivalent physical componentry facilitating such user interaction.

Figure 3:
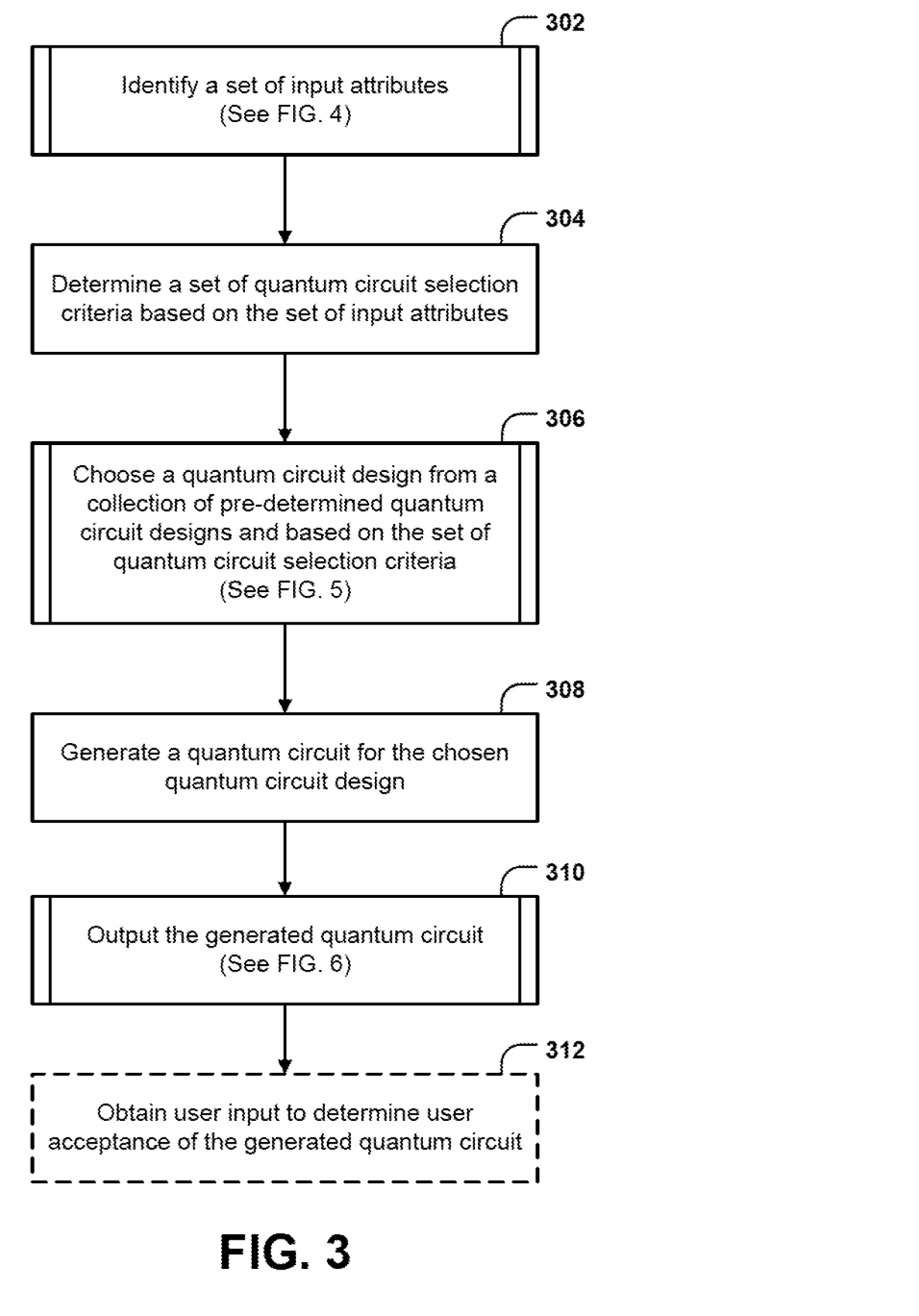
FIG. 3 illustrates a flowchart for selecting a quantum circuit, in accordance with some example embodiments described herein.

Turning first to FIG. 3, example operations are shown for selecting a quantum circuit.

As shown by operation 302, the apparatus 200 may include means, such as processor 202, communications hardware 206, or the like, for identifying a set of input attributes. While many approaches are contemplated herein, some embodiments for identifying the set of input attributes may utilize the method 400 illustrated in FIG. 4, which will now be described.

Figure 4:
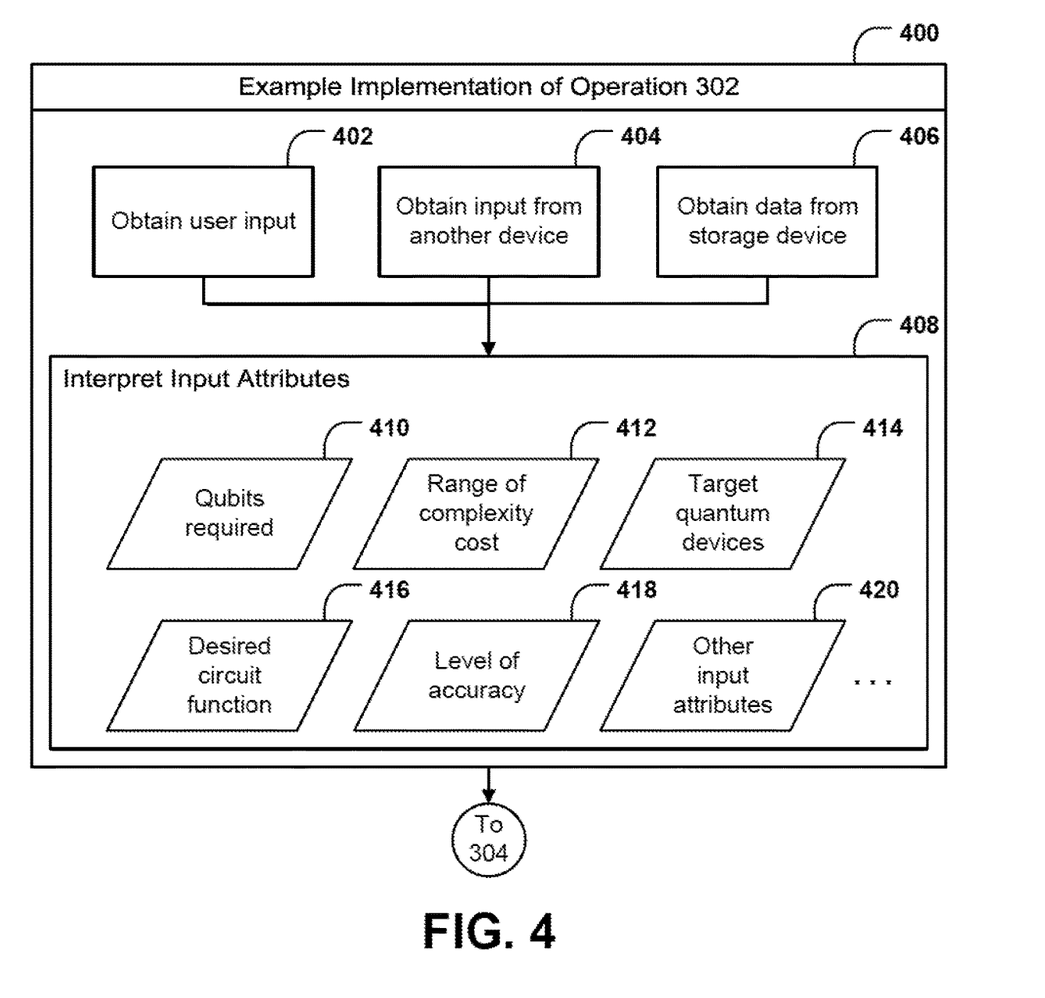
FIG. 4 illustrates a flowchart for identifying a set of input attributes, in accordance with some example embodiments described herein.

Turning now to FIG. 4, in some embodiments, the processor 202 and communications hardware 206 may identify the set of input attributes by (i) obtaining information such as user input 402, input from another device 404, or data from storage device 406 and (ii) interpreting the input attributes as shown in operation 408. In some embodiments, the processor 202 and communications hardware 206 may identify the set of input attributes using forms that require additional processing before the input attributes can be fully identified. For example, the processor 202 and communications hardware 206 may identify the set of input attributes by a user inputting a query in natural language, and the natural language may be subjected to interpretive analysis to identify the set of input attributes. In another example, the processor 202 and communications hardware 206 may obtain the set of input attributes from a batch system, and the information provided automatically from the batch system may be interpreted to identify the set of input attributes. In a further example, another device may store metadata that the communications hardware 206 retrieves to identify the set of input attributes, and the processor 202 may interpret the metadata to identify the set of input attributes.

In some embodiments, a combination of user input 402, input from another device 404, or data from a storage device 406 may be used to identify the set of input attributes. For example, a user may specify the desired precision required of a quantum circuit and/or the input dataset from which the input attributes will be derived, while the number of qubits may be obtained from querying the capabilities of another connected device.

The set of input attributes may specify constraints usable to identify a quantum circuit that may perform a desired function. The set of input attributes may indicate the preferences and/or requirements for the quantum circuit to be selected. For example, as shown in FIG. 4, the set of input attributes may include the number of qubits required in the selected circuit 410, the acceptable range of complexity cost 412, the identity of a target quantum device 414, a desired circuit function 416 (e.g. state preparation, algorithm), the desired level of accuracy 418, and/or other input attributes 420. In sum, FIG. 4 demonstrates some example approaches for identifying the input attributes, although it will be understood that the set of input attributes may be identified via other methods without departing from embodiments disclosed herein.

Returning to FIG. 3, operation 304 illustrates that the apparatus 200 includes means, such as memory 204, quantum circuit selection circuitry 208, or the like, for determining a set of quantum circuit selection criteria. The quantum circuit selection circuitry 208 may determine the set of quantum circuit selection criteria by (i) identifying, from the set of input attributes, a problem type which will be solved via a quantum circuit, and (ii) using the identified problem type to discriminate the set of quantum circuit selection criteria from all quantum circuit selection criteria. The quantum circuit selection circuitry 208 may discriminate the set of quantum circuit selection criteria using a lookup table or other type of data structure found in memory 204 or another storage device. The lookup table may take, as input, the identified problem type and may provide, as output, the set of quantum circuit selection criteria. The set of quantum circuit selection criteria may be based on the set of input attributes. In some embodiments, it may be impossible to realize a quantum circuit that meets all of the conditions of the set of input attributes, and, in such cases, the system may generate the set of selection criteria that best satisfies the input attributes. Examples of quantum circuit selection criteria may include (i) the type of problem to be solved by the quantum circuit, (ii) a range of acceptable execution times, (iii) a range of the number of qubits required, (iv) a range of device quantum volumes required for execution, and/or (v) a range of desired accuracy of the outputs, measurement, or final quantum state of the quantum circuit.

In some embodiments, the set of input attributes may include insufficient information to realize any quantum circuits, and in such cases the selection criteria may be established in part using gap fillers, defaults, or other types of information necessary to obtain a set of quantum circuit selection criteria that may be used to identify realizable quantum circuits, obtained from memory 204.

As shown by operation 306, the apparatus 200 includes means, such as memory 204, quantum circuit selection circuitry 208, or the like, for choosing a quantum circuit design from a collection of pre-determined quantum circuit designs. The quantum circuit selection circuitry 208 may choose the quantum circuit design based on the set of quantum circuit selection criteria from a pool of pre-determined quantum circuit designs stored in memory 204 or another storage device. In some embodiments, the quantum circuit designs from the pool may be evaluated based on the ability of each respective quantum circuit design to meet the set of quantum circuit selection criteria. The evaluation of each quantum circuit design may take into account factors such as the complexity of the quantum circuit design, an accuracy provided by the quantum circuit design, and/or device requirements of the quantum circuit design, which may be specified by the set of quantum circuit selection criteria. In some embodiments, multiple criteria from the same set of quantum circuit selection criteria may make determining whether a quantum circuit design meets the set of quantum circuit criteria challenging. For example, the multiple criteria may interact in complex ways that require detailed information regarding the execution of quantum circuit designs.

In some embodiments, the set of input parameters indicates a problem to be solved using a quantum circuit, and the problem to be solved may dictate which type of quantum circuit design is best suited to address the problem. For example, a type of pre-determined quantum circuit design may be appropriate for representing a probability distribution function (one example of a quantum state that may be prepared by a quantum circuit), and this type of quantum circuit design for representing the probability distribution function may not be appropriate to perform a search over a dataset.

Figure 5:
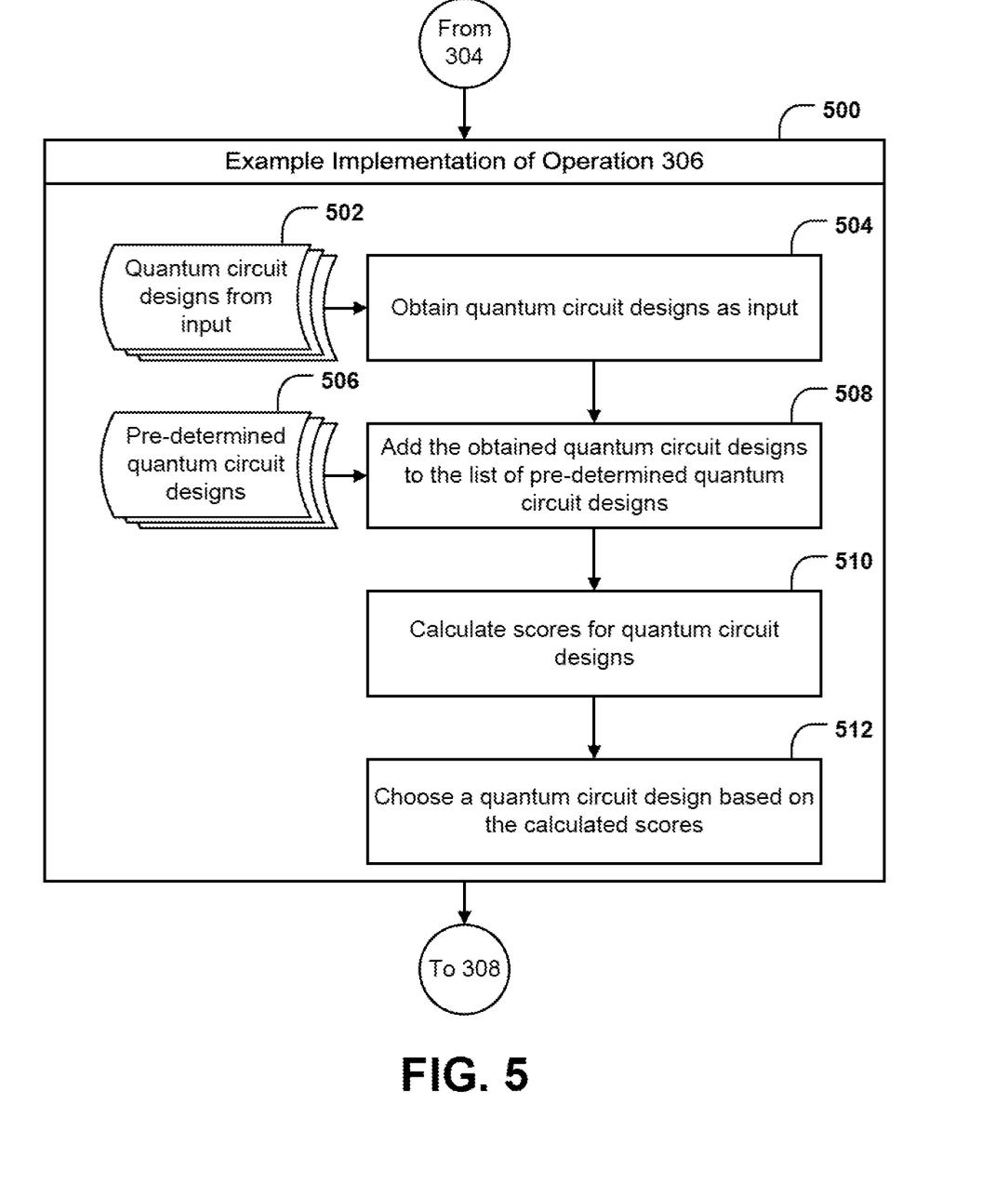
FIG. 5 illustrates a flowchart for choosing a quantum circuit design from a collection of pre-determined quantum circuit designs, in accordance with some example embodiments described herein.

Turning now to FIG. 5, example operations 500 are shown for choosing a quantum circuit design from a collection of pre-determined quantum circuit designs and based on the set of quantum circuit selection criteria. The quantum circuit design may be chosen via the method illustrated in FIG. 5, although the quantum circuit design may be chosen via other methods without departing from embodiments disclosed herein.

In some embodiments, one or more pre-determined quantum circuit designs may be obtained as input. As shown by operation 504, the apparatus 200 may include means, such as memory 204, communications hardware 206, or the like, for obtaining one or more pre-determined quantum circuit designs as input. The communications hardware 206 may obtain one or more pre-determined quantum circuit designs from input 502, where the quantum circuit designs from input 502 may comprise quantum circuit designs from a stored database in memory 204 or another storage device, or from user input. The pre-determined quantum circuit designs from input 502 may include a class of parametrized quantum circuits. The parametrized quantum circuits may be defined based on (i) one or more parameters, (ii) a number of qubits, and/or (iii) other parameters. The pre-determined quantum circuit designs from input 502 may include specific quantum circuits without parametrization. The pre-determined quantum circuit designs may include a particular algorithm for their generation, such as a search or variational method. The particular algorithm for the generation of a quantum circuit may include a list of operations which, when performed, allow a realizable quantum circuit to be generated.

In some embodiments, the obtained quantum circuit designs may be added to the list of pre-determined quantum circuit designs. As shown by operation 508, the apparatus 200 may include means, such as memory 204, quantum circuit selection circuitry 208, or the like, for adding the obtained quantum circuit designs to the list of pre-determined quantum circuit designs. The quantum circuit selection circuitry 208 may first identify pre-determined quantum circuit designs 506 using memory 204 or other storage. The quantum circuit selection circuitry 208 may then add by merging the pre-determined quantum circuit designs 506 with the quantum circuit designs from input 502, if any quantum circuit designs from input 502 were obtained in operation 504. The merge may eliminate duplicated quantum circuit designs found in both collections. The merge may also restructure the collections of pre-determined quantum circuit designs to efficiently store and access the quantum circuit designs.

In some embodiments, scores may be calculated for quantum circuit designs in the collection of pre-determined quantum circuit designs. As shown by operation 510, the apparatus 200 may include means, such as quantum circuit selection circuitry 208, or the like, for calculating scores for quantum circuit designs. In some embodiments, the quantum circuit selection circuitry 208 may assign weights to the quantum circuit selection criteria from the set of quantum circuit selection criteria, and may calculate scores based on these weights for quantum circuit designs from the collection of pre-determined quantum circuit designs. In some embodiments, the quantum circuit selection circuitry 208 may calculate these scores using a machine learning technique that combines the weighted quantum circuit selection criteria into scores that are assigned to the quantum circuit designs. The machine learning technique may take as input the attributes of a particular quantum circuit design and output a numerical value scoring the appropriateness of a quantum circuit design for the class of problem specified in the quantum circuit selection criteria. As shown in FIG. 5, the calculation of weights may take into account one or more quantum circuit designs from input 502 from operation 504 in addition to the pre-determined quantum circuit designs 506.

In some embodiments, a quantum circuit design may be chosen based on the calculated scores. As shown by operation 512, the apparatus 200 may include means, such as quantum circuit selection circuitry 208, or the like, for choosing a quantum circuit design based on the calculated scores. The quantum circuit selection circuitry 208 may choose the quantum circuit design with the highest score evaluated from operation 510. The quantum circuit selection circuitry 208 may also apply a cutoff based on a pre-determined score threshold and choose a plurality of quantum circuit designs above the pre-determined score threshold. Following selection of a quantum circuit design, the procedure may advance to operation 308 of FIG. 3.

Returning to FIG. 3, as shown by operation 308, the apparatus 200 includes means, such as quantum circuit generation circuitry 210, or the like, for generating a quantum circuit for the chosen quantum circuit design. The quantum circuit generation circuitry 210 may generate a quantum circuit by (i) providing a list of specific quantum gates acting on a specific number of quantum states (e.g. qubits), (ii) providing parameters upon which the quantum gates depend, and (iii) providing other types of information that may be used to configure general purpose quantum computing hardware into a special purpose quantum hardware that performs an objective indicated by the set of input attributes obtained through operation 302. In some embodiments, the generation of a quantum circuit may involve processing of one or more particular algorithms as part of a pre-determined quantum circuit design which was chosen in operation 306. The algorithms may include a variational method or search. In some embodiments, the generation of a quantum circuit may include copying the quantum circuit design (e.g., for quantum circuit designs that do not require performance of algorithms to obtain the corresponding quantum circuit).

As shown by operation 310, the apparatus 200 includes means, such as memory 204, communications hardware 206, quantum circuit generation circuitry 210, or the like, for outputting the generated quantum circuit. The communications hardware 206 and quantum circuit generation circuitry 210 may output the generated quantum circuit for various purposes. For example, a schematic of the generated quantum circuit may be output for display for a user to review, or the generated quantum circuit may be output as computer code and displayed to the user for editing or later execution. The communications hardware 206 and quantum circuit generation circuitry 210 may output the generated quantum circuit in a number of ways including (i) displaying the generated quantum circuit, (ii) causing transpilation and execution of the generated quantum circuit on a selected host device, and/or (iii) storing the generated quantum circuit in memory 204 or another storage location for later use.

Figure 6:
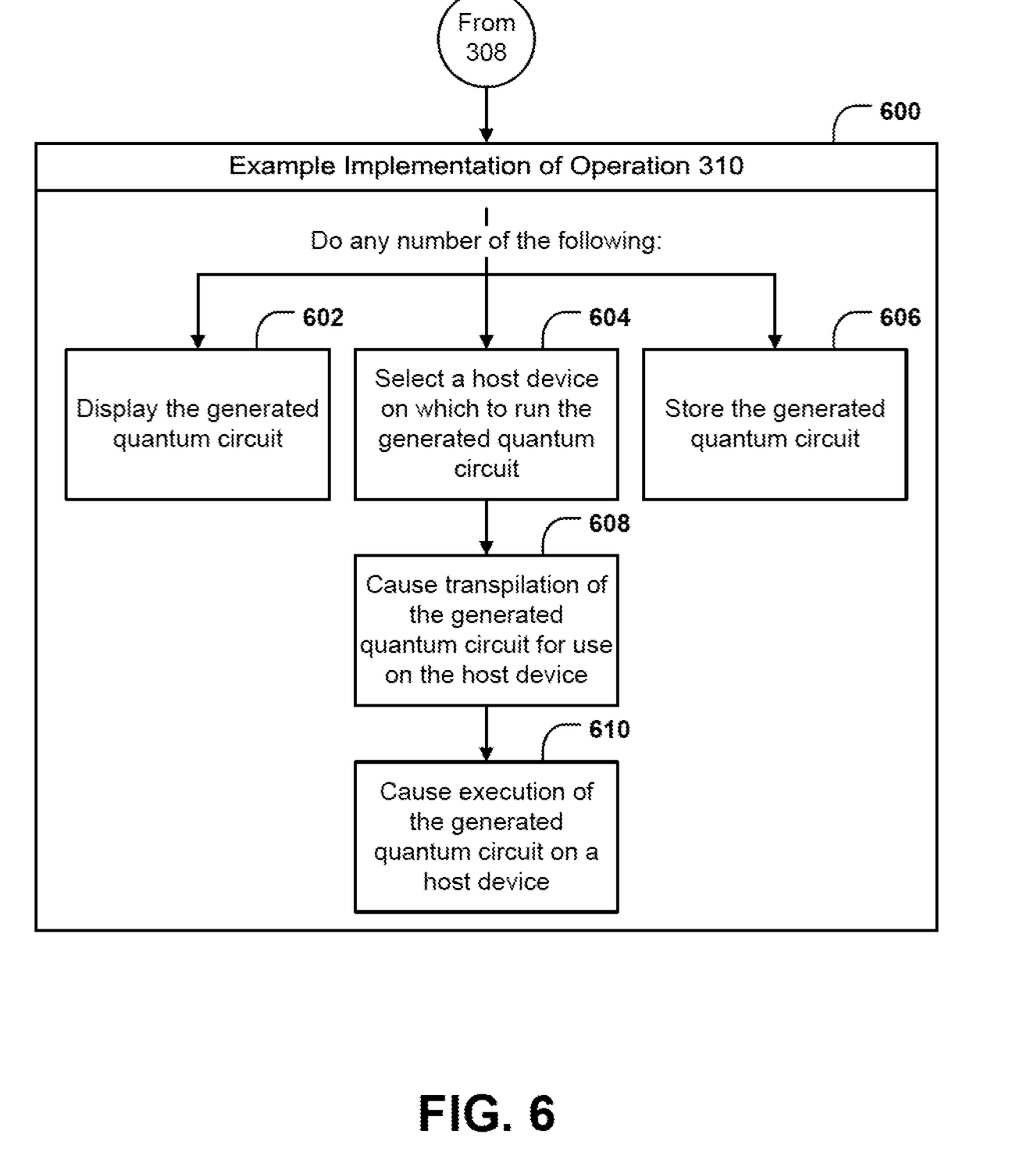
FIG. 6 illustrates a flowchart for outputting a generated quantum circuit design, in accordance with some example embodiments described herein.

Turning now to FIG. 6, example operations 600 are shown for outputting the generated quantum circuit. The generated quantum circuit may be output via the method illustrated in FIG. 6. The generated quantum circuit may be chosen via other methods without departing from embodiments disclosed herein.

In some embodiments, the communications hardware 206 may display the generated quantum circuit. As shown by operation 602, the apparatus 200 may include means, such as communications hardware 206, or the like, the displaying the generated quantum circuit. The communications hardware 206 may display the generated quantum circuit by rendering the quantum circuit into one or more representations. The representations the displayed quantum circuit may take may include graphical, text, or other representations. The rendered display of the generated quantum circuit may then be displayed using the capabilities of the communications hardware 206 such as a monitor, printer, or other device.

In some embodiments, the communications hardware 206 may select a host device on which to run the generated quantum circuit. As shown by operation 604, the apparatus 200 may include means, such as communications hardware 206, quantum circuit generation circuitry 210, or the like, for selecting a host device on which to execute the generated quantum circuit. The communications hardware 206 may select a host device by first acquiring a set of requirements for the host device. The quantum circuit generation circuitry 210 may derive the set of requirements from the quantum circuit selection criteria found in operation 304. A set of host device properties may then be obtained. The set of host device properties may be received from a query of other devices, generated for a set of simulated devices, or obtained by other means. The set of device requirements may then be compared to the set of host device properties. This comparison may find a subset of potential host devices that meet the restrictions defined by the set of device requirements. Further evaluations may be made to restrict the subset of potential host devices and select a host device on which to run the generated quantum circuit. For example, the subset of potential host devices may be further restricted by selecting the host device with the most efficient network connection to the apparatus 200, or the host device with the least user demand.

In some embodiments, the host device may be a quantum computer or a simulator. The selection of the host device may then be based on input attributes that the quantum circuit selection system has stored from operation 302. In some embodiments the host device may be a storage device, and the quantum circuit is stored for later use. In some embodiments the selection of a host device may take into account factors such as the availability of host devices, number of qubits of the host device, or quantum depth of the host device. The selection of the host device may also take into account the quantum circuit selection criteria from operation 304, ensuring the generated quantum circuit is compatible with the attributes of the host device.

In some embodiments, the communications hardware 206 may store the generated quantum circuit. As shown by operation 606, the apparatus may include means, such as memory 204, communications hardware 206, or the like, for storing the generated quantum circuit. The generated quantum circuit may be stored by transferring the generated quantum circuit data to a storage device via communications hardware 206, or stored in memory 204 or another storage device. After being stored, the generated quantum circuit may be retrieved later for display, execution on a host device, or other uses.

In some embodiments, the quantum circuit generation circuitry 210 may cause transpilation of the generated quantum circuit for use on the host device. As shown by operation 608, the apparatus 200 may include means, such as communications hardware 206, quantum circuit generation circuitry 210, or the like, for causing transpilation of the generated quantum circuit for use on the host device. The quantum circuit generation circuitry 210 may cause transpilation by passing the generated quantum circuit design to a transpilation algorithm. The transpilation algorithm may execute on the same device, or may execute on a remote host caused by communications hardware 206. A set of attributes of the host machine on which the quantum circuit will be executed may also be passed to the transpilation algorithm. The transpilation algorithm may use the generated quantum circuit and the set of attributes about the host machine on which the generated quantum circuit will be executed to transpile the circuit for the host device. The transpiled quantum circuit may then be returned to the quantum circuit generation circuitry 210 via the communications hardware 206. The transpiled quantum circuit may also be passed directly to the host device, or it may be stored for later use on a storage device.

Transpilation here refers to a process analogous to compilation of software for a classical computer, wherein optimizations are made in a quantum circuit permitting it to run efficiently on a certain device, changing the set of operations to match the capabilities of a device or making other changes with the aim of improving performance on a target device. In some embodiments, the transpilation requires information about the attributes of a host device, so this information may be received in operation 604. In some embodiments, transpilation may use additional circuitry or take place on another system. For example, the communications hardware 206 may transfer the quantum circuit to a remote host, and receive a transpiled quantum circuit in response. Alternatively, the quantum circuit generation circuitry 210 may locally transpile the quantum circuit.

In some embodiments the communications hardware 206 may cause execution of the generated quantum circuit on the host device. As shown by operation 610, the apparatus 200 may include means, such as communications hardware 206, or the like, for causing execution of the generated quantum circuit on the host device. The communications hardware 206 may cause the generated quantum circuit to be executed on the host device by transmitting the generated quantum circuit or the transpiled quantum circuit to the host device and transmitting an execution command. The execution command may specify attributes of the execution such as the number of shots, or times the circuit should be executed, how to transmit results from the execution, or what to do in the case of errors. The attributes may impact the operations performed by the host device when executing the generated quantum circuit.

Returning to FIG. 3, as shown by operation 312, the apparatus 200 may include means, such as memory 204, communications hardware 206, or the like, for obtaining user input to determine user acceptance of the generated quantum circuit. The user may, after reviewing the generated quantum circuit output, provide feedback to the system to label the generated quantum circuit as acceptable or not acceptable. The user feedback may be stored in memory 204 or other storage, along with the selected quantum circuit design, where the feedback may act as a label for the selected quantum circuit design. As the number of generated quantum circuits grows, the memory 204 may collect a labeled dataset of quantum circuit designs which may be used as a factor to drive future quantum circuit selection decisions. For example, the labeled dataset may be used to train a decision tree mechanism for subsequent quantum circuit design selection.

In embodiments where one or more additional quantum circuit designs satisfy the set of quantum circuit selection criteria, the quantum circuit selection circuitry 208 may choose one or more additional quantum circuit designs from the collection of pre-determined quantum circuit designs while performing operation 306. In performing operation 306, the quantum circuit selection circuitry 208 may calculate scores for the quantum circuit designs in the collection of quantum circuit designs, as described above for example operation 510. Using the scores assigned to the quantum circuit designs, the quantum circuit selection circuitry 208 may select multiple quantum circuit designs based on a threshold score. Any quantum circuit designs with a score above the threshold score may then be chosen. In the case that multiple quantum circuit designs are chosen, the multiple chosen quantum circuit designs may be passed to the quantum circuit generation circuitry 210 for generation of the quantum circuit. It will be understood, however, that some embodiments may choose only a single quantum circuit design even if multiple quantum circuit designs satisfy the set of quantum circuit selection criteria. The number of satisfactory quantum circuit designs chosen may be a parameter predefined by the user or an administrator, although in some cases it may be specified at runtime.

In some embodiments, the quantum circuit generation circuitry 210 may generate an additional quantum circuit for the one or more additional quantum circuit designs chosen by the quantum circuit selection circuitry 208 while performing operation 308. In these embodiments, example operation 308 may be performed to generate a quantum circuit for one or more of the chosen circuit design chosen by the quantum circuit selection circuitry 208. The generation of the quantum circuits may otherwise proceed as described above for example operation 308. The generation of the quantum circuits may proceed serially, or in parallel to more efficiently process the generation of the quantum circuits.

In some embodiments, the communications hardware 206 may output the one or more generated additional quantum circuits generated by the quantum circuit generation circuitry 210 while performing operation 310. In these embodiments, example operation 310 may be performed once for one or more of the generated additional quantum circuits, either serially or in parallel. Several or all of the generated additional quantum circuits may also be output in an aggregate manner. For example, if the output is in the form of displaying circuit diagrams, multiple diagrams may be displayed simultaneously for comparison purposes. The output of multiple generated quantum circuits may be presented to allow a user to select a preferred quantum circuit. For example, the quantum circuit generation circuitry 210 and communications hardware 206 may generate and present multiple generated quantum circuits to the user that all satisfy the set of input attributes. The user may then make an additional selection among all of the generated quantum circuits satisfying the set of input attributes. The scores of the generated additional quantum circuits, calculated by the quantum circuit selection circuitry 208, may also be displayed to the user. In some embodiments, the generated quantum circuits may be output to one or more remote hosts for execution of the quantum circuits.

In some embodiments, execution of the generated quantum circuit prepares a quantum state of interest. The generated quantum circuit may belong to a class of quantum circuits that has the main purpose of loading and representing data as a quantum state. In some embodiments, the generated quantum circuit may use amplitudes of the prepared quantum state of interest corresponding to values of certain data to be loaded and represented. In some embodiments, the circuits may use basis states to load and represent discrete values of some set of data as a quantum state of interest. In some embodiments, ways of loading and representing data in a quantum state of interest may use concepts of both amplitudes of the quantum state and basis states as described above. Other ways of loading and representing a quantum state of interest may also be used, employing a combination of the above techniques or other techniques that prepare a quantum state of interest.

In some embodiments, execution of the generated quantum circuit prepares a quantum state representing an approximation of the normal distribution. The generated quantum circuit may belong to a class of quantum circuits that has the main purpose of loading and approximating the normal distribution as a quantum state. In some embodiments, the generated quantum circuit may use amplitudes of the prepared quantum state corresponding to discrete values of intervals of the normal distribution to approximate the normal distribution. In some embodiments, the generated quantum circuit may use basis states to load and represent discrete values of intervals of the normal distribution to represent an approximation of the normal distribution. In some embodiments, ways of loading and approximating the normal distribution in a quantum state may use concepts of both amplitudes of the quantum state and basis states as described above. Other ways of encoding the approximate normal distribution quantum state may also be used, employing a combination of the above techniques or other techniques that prepare a quantum state approximating the normal distribution.

In some embodiments, the collection of pre-determined quantum circuit designs comprises a quantum circuit design approximating the normal distribution with a trigonometric function using a plurality of Fourier coefficients. In these embodiments, the quantum circuit design approximating the normal distribution applies a series of quantum gates and other operations to encode a plurality of Fourier coefficients into a quantum state. The Fourier coefficients are terms from a discrete Fourier transform of a predefined function. The amplitudes of the quantum state refer to quantum mechanical amplitudes in a predefined basis, such as the computational basis, whose numerical values may correspond to the values of the Fourier coefficients being encoded, and may differ by a normalization factor. The quantum circuit design approximating the normal distribution may apply an inverse quantum Fourier transform to transform the quantum state encoding a plurality of Fourier coefficients into a quantum state encoding a trigonometric function raised to a power. The trigonometric function raised to a power may provide an approximation of the normal distribution. The inverse Fourier transform may be applied to a number of qubits depending on the number of Fourier coefficients used, the number of qubits in the circuit design, or other factors. The quantum state encoding the approximate normal distribution may have a probability distribution given by a power of trigonometric functions which, when measured, produces measurement values corresponding to an approximation of the normal distribution.

Finally, in some embodiments, the collection of pre-determined quantum circuit designs comprises a quantum circuit design created using a genetic programming algorithm. In these embodiments, the quantum circuit selection circuitry 208 may obtain a quantum circuit design created using a genetic programming algorithm either as input or stored as a pre-determined quantum circuit design. The quantum circuit design created using a genetic programming algorithm may be generated by (i) randomly generating a population of potential quantum circuit designs, (ii) evaluating the fitness of potential quantum circuit design in the population, (iii) selecting a subset of the most fit potential quantum circuit designs from the population, and (iv) modifying the potential quantum circuit designs from the subset of the most fit potential quantum circuit designs to create a new population. The procedure may then return to step (ii) with the new population and repeat until a pre-determined level of fitness is achieved. The quantum circuit generation circuitry 210 may create the quantum circuit design by executing the genetic programming algorithm, or copying the realized quantum circuit from storage.

As described above, example embodiments provide methods and apparatuses that enable improved selection of quantum circuits. Example embodiments thus provide tools that overcome the problems faced by users of quantum computers, doing so by removing the need for detailed knowledge of the implementation of certain quantum circuits, allowing users to gain access to a quantum circuit that best matches the problem they wish to solve. Moreover, embodiments described herein automate the process of selecting a quantum circuit, saving time and removing potential for error, which is helpful for users of any level of skill and experience. The example embodiments thus broaden the potential pool of users for quantum computers, enabling the productive use of this technology for a larger set of applications. The example embodiments also maximize the usage of quantum computing time, thus enabling quantum computers to operate more efficiently, by eliminating cases where the wrong quantum circuit is chosen for a particular application. Example embodiments therefore shorten the time needed to find optimal ways to overcome problems with quantum computers.

For example, a user may wish to use an embodiment to generate a quantum state representing an approximation of the normal distribution. The user may specify using text input indicating to prepare a quantum state every 15 minutes based on a dataset found at a specified network address, with moderate accuracy. The user may further specify a quantum computer host at a remote site where the state should be prepared. The embodiment may then interpret the input to form a set of input attributes, and then may generate a set of selection criteria that comprises (i) a normal distribution should be represented in a quantum state prepared by the quantum circuit, (ii) an execution time between three to six seconds is permissible, (iii) 12 qubits are needed to store the desired quantum state, (iv) a device with quantum volume of at least 128 is needed to store the desired quantum state, and (v) an accuracy in the range of $10^{-3}$ to $10^{-6}$ is required. The quantum circuit selection circuitry may then consider three pre-determined quantum circuit designs, A, B, and C. Quantum circuit design A may require eight seconds to execute, so it is automatically assigned a score of zero. Quantum circuit design B may be able to execute in three seconds, but has accuracy of $10^{-3}$. Quantum circuit design C may be able to execute in four seconds, but has accuracy of $10^{-5}$. The quantum circuit selection circuitry may give a much stronger weight to accuracy than execution time for this particular problem, so quantum circuit design C may be given a higher score than quantum circuit design B. Thus the quantum circuit selection circuitry in this example chooses quantum circuit design C, after comparing the scores of each of the pre-determined quantum circuit designs. Finally, the embodiment communicates with the remote quantum computer host, then the quantum circuit selection circuitry transpiles quantum circuit C and transfers the transpiled quantum circuit to the remote quantum computer with instructions and parameters for execution. The user may then review the results of the executed transpiled quantum circuit and use the results to update their set of input attributes to conduct further experimentation.

As these examples all illustrate, example embodiments contemplated herein provide technical solutions that solve real-world problems faced during selection of quantum circuits. And while the selection of quantum circuits has been an issue for as long as quantum computers have been used, the recently rising number of users and potential applications made available by recently emerging technology has made this problem significantly more acute. Example embodiments described herein thus represent a technical solution to these real-world problems.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for selecting a quantum circuit, the method comprising:
   identifying, by communications hardware, a set of input attributes;
   determining, by quantum circuit selection circuitry, a set of quantum circuit selection criteria based on the set of input attributes, wherein the set of quantum circuit selection criteria comprises an indication of a first quantum computing device;
   choosing, by the quantum circuit selection circuitry, a quantum circuit design from a collection of pre-determined quantum circuit designs and based on the set of quantum circuit selection criteria, wherein the quantum circuit design is executable on a second quantum computing device;
   generating, by quantum circuit generation circuitry, a quantum circuit for the chosen quantum circuit design;
   selecting, by the quantum circuit generation circuitry, the first quantum computing device on which to execute the generated quantum circuit based on the set of quantum circuit selection criteria;
   causing, by the quantum circuit generation circuitry, transpilation of the generated quantum circuit for use on the first quantum computing device; and
   outputting, by the communications hardware, the generated quantum circuit.

2. The method of claim 1, further comprising:
   choosing, by the quantum circuit selection circuitry, one or more additional quantum circuit designs from the collection of pre-determined quantum circuit designs, wherein the additional quantum circuit designs satisfy the set of quantum circuit selection criteria;
   generating, by the quantum circuit generation circuitry, an additional quantum circuit for the one or more additional quantum circuit designs; and
   outputting, by the communications hardware, the generated additional quantum circuits.

3. The method of claim 1, wherein execution of the generated quantum circuit prepares a quantum state of interest.

4. The method of claim 1, wherein execution of the generated quantum circuit prepares a quantum state representing an approximation of a normal distribution.

5. The method of claim 1, wherein the collection of pre-determined quantum circuit designs comprises:
   a quantum circuit design approximating a normal distribution with a trigonometric function using a plurality of Fourier coefficients; or
   a quantum circuit design created using a genetic programming algorithm.

6. The method of claim 1, wherein identifying the set of input attributes is based on obtaining:
   (i) user input;
   (ii) input from another device;
   (iii) data from a storage device; or
   (iv) a combination thereof.

7. The method of claim 1, wherein choosing the quantum circuit design includes:
   calculating scores for quantum circuit designs in the collection of pre-determined quantum circuit designs; and
   choosing the quantum circuit design based on the calculated scores.

8. The method of claim 1, further comprising:
   obtaining, by the communications hardware, one or more pre-determined quantum circuit designs as input; and
   adding, by the quantum circuit selection circuitry, the one or more pre-determined quantum circuit designs from input to the collection of pre-determined quantum circuit designs.

9. The method of claim 1, further comprising:
   causing execution of the generated quantum circuit on a host device.

10. The method of claim 1, further comprising:
    after outputting the generated quantum circuit: obtaining, by the communications hardware, user input to determine user acceptance of the generated quantum circuit.

11. An apparatus for selecting a quantum circuit, the apparatus comprising:
    communications hardware configured to:
      identify a set of input attributes;
    quantum circuit selection circuitry configured to:
      determine a set of quantum circuit selection criteria based on the set of input attributes, wherein the set of quantum circuit selection criteria comprises an indication of a first quantum computing device; and
      choose a quantum circuit design from a collection of pre-determined quantum circuit designs and based on the set of quantum circuit selection criteria, wherein the quantum circuit design is executable on a second quantum computing device; and
    quantum circuit generation circuitry configured to:
      generate a quantum circuit for the chosen quantum circuit design,
      select the first quantum computing device on which to execute the generated quantum circuit based on the set of quantum circuit selection criteria, and
      cause transpilation of the generated quantum circuit for use on the first quantum computing device,
    wherein the communications hardware is further configured to output the generated quantum circuit.

12. The apparatus of claim 11, wherein the collection of pre-determined quantum circuit designs comprises:
    a quantum circuit design approximating a normal distribution with a trigonometric function using a plurality of Fourier coefficients; or
    a quantum circuit design created using a genetic programming algorithm.

13. The apparatus of claim 11, wherein the communications hardware is further configured to identify the set of input attributes based on obtaining:
(i) user input;
(ii) input from another device;
(iii) data from a storage device; or
(iv) a combination thereof.

14. The apparatus of claim 11, wherein the quantum circuit selection circuitry is further configured to:
calculate scores for quantum circuit designs in the collection of pre-determined quantum circuit designs; and
choose the quantum circuit design based on the calculated scores.

15. The apparatus of claim 11, wherein the communications hardware is further configured to obtain one or more pre-determined quantum circuit designs as input, and
wherein the quantum circuit selection circuitry is further configured to add the one or more pre-determined quantum circuit designs from input to the collection of pre-determined quantum circuit designs.

16. The apparatus of claim 11, wherein the communications hardware is further configured to cause execution of the generated quantum circuit on a host device.

17. The apparatus of claim 11, wherein the communications hardware is further configured to:
after outputting the generated quantum circuit: obtain user input to determine user acceptance of the generated quantum circuit.

18. A computer program product for selecting a quantum circuit, the computer program product comprising at least one non-transitory computer-readable storage medium storing software instructions that, when executed, cause a device to:
identify a set of input attributes;
determine a set of quantum circuit selection criteria based on the set of input attributes, wherein the set of quantum circuit selection criteria comprises an indication of a first quantum computing device;
choose a quantum circuit design from a collection of pre-determined quantum circuit designs and based on the set of quantum circuit selection criteria, wherein the quantum circuit design is executable on a second quantum computing device;
generate a quantum circuit for the chosen quantum circuit;
select the first quantum computing device on which to execute the generated quantum circuit based on the set of quantum circuit selection criteria;
cause transpilation of the generated quantum circuit for use on the first quantum computing device; and
output the generated quantum circuit.

19. The computer program product of claim 18 wherein the software instructions, when executed, cause the device to:
choose one or more additional quantum circuit designs from the collection of pre-determined quantum circuit designs, wherein the additional quantum circuit designs satisfy the set of quantum circuit selection criteria;
generate an additional quantum circuit for the one or more additional quantum circuit designs; and
output the generated additional quantum circuits.

20. The computer program product of claim 18 wherein execution of the generated quantum circuit prepares a quantum state of interest.

* * * * *